(12) United States Patent
Nguyen

(10) Patent No.: US 6,776,236 B1
(45) Date of Patent: Aug. 17, 2004

(54) METHODS OF COMPLETING WELLS IN UNCONSOLIDATED FORMATIONS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 112 days.

(21) Appl. No.: 10/272,614

(22) Filed: Oct. 16, 2002

(51) Int. Cl.$^7$ ............................................. E27B 43/12
(52) U.S. Cl. ................. 166/279; 166/280.2; 166/308.1; 166/281; 166/295; 166/293
(58) Field of Search ........................ 166/280.2, 308.1, 166/276, 278, 281, 285, 295, 279, 293

(56) References Cited

U.S. PATENT DOCUMENTS

| | | |
|---|---|---|
| 1,305,915 A | 6/1919 | Mack |
| 1,341,755 A | 6/1920 | Minton |
| 2,207,334 A | 7/1940 | Reynolds et al. |
| 2,342,913 A | 2/1944 | Williams et al. |
| 2,344,909 A | 3/1944 | Williams et al. |
| 3,646,999 A | 3/1972 | Hamby, Jr. et al. ......... 166/281 |
| 3,670,817 A | 6/1972 | Saucler et al. ............. 166/252 |
| 3,747,678 A | 7/1973 | Waid ........................ 166/295 |
| 4,042,032 A | 8/1977 | Anderson et al. .......... 166/276 |
| 4,070,865 A | 1/1978 | McLaughlin ................. 61/36 |
| 4,072,194 A | 2/1978 | Cole et al. ................. 166/295 |
| 4,085,802 A | 4/1978 | Sifferman et al. .......... 166/295 |
| 4,102,395 A | 7/1978 | Robinson ................... 166/231 |
| 4,110,275 A | 8/1978 | Sifferman et al. ........... 260/14 |
| 4,272,384 A | 6/1981 | Martin ...................... 252/8.55 |
| 4,291,766 A | 9/1981 | Davies et al. ............... 166/276 |
| 4,428,436 A | 1/1984 | Johnson ..................... 172/372 |
| 4,483,888 A | 11/1984 | Wu ............................ 427/336 |
| 4,770,336 A | 9/1988 | Arterbury et al. ........... 228/182 |
| 4,829,100 A | 5/1989 | Murphey et al. ............ 523/131 |
| 4,945,991 A | 8/1990 | Jones ........................ 166/278 |
| 5,058,676 A | 10/1991 | Fitzpatrick et al. ......... 166/278 |
| 5,082,052 A | 1/1992 | Jones et al. ................. 166/51 |
| 5,101,900 A | 4/1992 | Dees ......................... 166/260 |
| 5,113,935 A | 5/1992 | Jones et al. ................. 166/51 |
| 5,128,390 A | 7/1992 | Murphey et al. ............ 523/130 |
| 5,129,458 A | 7/1992 | King et al. .................. 166/295 |
| 5,161,613 A | 11/1992 | Jones ........................ 166/242 |
| 5,161,618 A | 11/1992 | Jones et al. ................. 166/308 |
| 5,232,961 A | 8/1993 | Murphey et al. ............ 523/414 |
| 5,314,023 A | 5/1994 | Dartez et al. ............... 166/295 |
| 5,333,688 A | 8/1994 | Jones et al. ................. 166/278 |
| 5,341,880 A | 8/1994 | Thorstensen et al. ....... 166/278 |
| 5,368,102 A | 11/1994 | Dewprashad ............... 166/276 |
| 5,381,864 A * | 1/1995 | Nguyen et al. ........... 166/280.1 |
| 5,404,950 A | 4/1995 | Ng et al. .................... 166/277 |
| 5,417,284 A | 5/1995 | Jones ........................ 166/280 |
| 5,419,394 A | 5/1995 | Jones ........................ 166/51 |
| 5,435,391 A | 7/1995 | Jones ........................ 166/308 |
| 5,476,143 A | 12/1995 | Sparlin et al. .............. 166/233 |
| 5,492,178 A * | 2/1996 | Nguyen et al. ............. 166/276 |
| 5,515,915 A | 5/1996 | Jones et al. ................. 166/51 |
| 5,547,027 A | 8/1996 | Chan et al. ................. 166/295 |
| 5,560,427 A | 10/1996 | Jones ........................ 166/280 |
| 5,579,844 A | 12/1996 | Rebardi et al. ............. 166/296 |
| 5,588,487 A | 12/1996 | Bryant ....................... 166/51 |
| 5,609,204 A | 3/1997 | Rebardi et al. ............. 166/51 |
| 5,609,207 A | 3/1997 | Dewprashad et al. ....... 166/276 |
| 5,669,445 A | 9/1997 | Edwards .................... 166/278 |
| 5,791,415 A | 8/1998 | Nguyen et al. ............. 166/280 |
| 5,890,533 A | 4/1999 | Jones ........................ 166/51 |
| 5,908,073 A * | 6/1999 | Nguyen et al. ............. 166/276 |
| 5,921,317 A * | 7/1999 | Dewprashad et al. ..... 166/280.1 |
| 5,924,488 A * | 7/1999 | Nguyen et al. .......... 166/280.1 |
| 5,934,376 A | 8/1999 | Nguyen et al. ............. 166/278 |
| 5,944,105 A * | 8/1999 | Nguyen ..................... 166/278 |
| 5,945,461 A | 8/1999 | Gosiewski et al. .......... 521/123 |
| 5,957,205 A | 9/1999 | Bohme et al. .............. 166/296 |
| 5,960,880 A | 10/1999 | Nguyen et al. ............. 166/280 |
| 6,003,600 A | 12/1999 | Nguyen et al. ............. 166/281 |
| 6,006,835 A | 12/1999 | Onan et al. ................. 166/295 |
| 6,016,870 A | 1/2000 | Dewprashad et al. ....... 166/295 |
| 6,068,055 A | 5/2000 | Chatterji et al. ............ 166/293 |
| 6,079,492 A * | 6/2000 | Hoogteijling et al. ....... 166/276 |
| 6,155,348 A * | 12/2000 | Todd ....................... 166/280.2 |
| 6,220,345 B1 | 4/2001 | Jones et al. ................. 166/51 |
| 6,257,335 B1 | 7/2001 | Nguyen et al. ............. 166/280 |
| 6,302,207 B1 | 10/2001 | Nguyen et al. ............. 166/276 |
| 6,311,773 B1 | 11/2001 | Todd et al. ................. 166/280 |
| 6,427,775 B1 | 8/2002 | Dusterhoft et al. ......... 166/278 |
| 6,446,722 B2 | 9/2002 | Nguyen et al. ............. 166/278 |

FOREIGN PATENT DOCUMENTS

| | | |
|---|---|---|
| EP | 0421822 | 10/1990 |
| EP | 0909874 | 10/1998 |
| EP | 0909875 | 10/1998 |
| EP | 1130215 A2 | 2/2001 |
| EP | 1318270 A1 | 12/2002 |
| GB | 2316967 | 3/1998 |
| GB | 2317630 | 4/1998 |
| WO | 93/04267 | 8/1992 |

(List continued on next page.)

Primary Examiner—Roger Schoepper
(74) Attorney, Agent, or Firm—Robert A. Kent; C. Clark Dougherty, Jr.

(57) ABSTRACT

Methods of completing unconsolidated hydrocarbon producing zones penetrated by cased and cemented well bores are provided. The methods include the steps of forming spaced openings through the casing and cement and injecting a first hardenable resin composition through the openings into the unconsolidated producing zone adjacent to the well bore. Without waiting for the first hardenable resin composition to harden, a fracturing fluid containing proppant particles coated with a second hardenable resin composition is injected through the openings into the unconsolidated producing zone at a rate and pressure sufficient to fracture the producing zone. The proppant particles coated with the second hardenable resin composition are deposited in the fractures and the first and second hardenable resin compositions are allowed to harden by heat.

50 Claims, No Drawings

FOREIGN PATENT DOCUMENTS

| | | |
|---|---|---|
| WO | 93/22536 | 11/1993 |
| WO | 94/16194 | 7/1994 |
| WO | 95/14844 | 6/1995 |
| WO | 95/33915 | 12/1995 |
| WO | 00/61913 | 10/2000 |
| WO | 01/14691 | 3/2001 |
| WO | 01/44619 | 6/2001 |
| WO | 02/46574 A1 | 6/2002 |

* cited by examiner

METHODS OF COMPLETING WELLS IN UNCONSOLIDATED FORMATIONS

BACKGROUND OF THE INVENTION

1. Field of the Invention

The present invention relates to methods of completing unconsolidated hydrocarbon producing zones whereby proppant particles and formation solids do not flow-back with produced hydrocarbons.

2. Description of the Prior Art

Hydrocarbon producing wells are often completed in unconsolidated formations containing loose and incompetent particulate solids, e.g., sand, which migrate with hydrocarbons and/or water produced by the wells. The presence of the particulate solids in the produced fluids is highly undesirable in that the solid particles abrade tubular goods, pumping equipment, valves and other producing equipment and reduce the fluid production capabilities of the producing zone in the wells. Incompetent subterranean formations include those which contain loose particulate solids that are readily entrained by produced fluids and those wherein the particulate solids making up the formations are bonded together with insufficient bond strength to withstand the forces produced by the production of fluids from the formations.

A technique which is often used for minimizing particulate solid production from unconsolidated formations has been to produce fluids from the formations at low flow rates whereby the near well stabilities of particulate solid bridges and the like in the formations are preserved. However, the collapse of such particulate solid bridges often occurs as a result of unintentional high production rates and/or pressure cycling. Pressure cycling occurs from frequent shut-ins and start-ups of a well. The frequency of the pressure cycling is very critical to the longevity of the near well formation, especially during the depletion stage of the well when the pore pressure of the formation has already been significantly reduced.

Heretofore, unconsolidated formations have been treated by creating fractures in the formations and depositing proppant in the fractures to maintain them in open positions. In addition, the proppant has heretofore been consolidated within the fractures into hard permeable masses by hardenable resin compositions to reduce the migration of particulate solids through the fractures with produced fluids. Very often, to insure that particulate solids are not produced, costly gravel packs, sand screens and the like have also been installed in the wells. Since gravel packs and sand screens filter out particulate solids from the fluids being produced, the presence of the filtered particulate solids adds to the flow resistance thereby producing additional pressure draw-down which causes the fracture faces and other portions of the unconsolidated formations to break down and the consolidated proppant in fractures, gravel packs and the like to be bypassed. In addition, pressure cycling often causes the consolidated proppant particles within the fractures to break down whereby proppant particle flow-back with produced fluids occurs.

Thus, there is a need for improved methods of completing wells in unconsolidated formations whereby the migration of formation particulate solids and proppant particle flow-back with produced fluids are prevented.

SUMMARY OF THE INVENTION

The present invention provides improved methods of completing an unconsolidated hydrocarbon producing zone penetrated by a well bore having casing cemented therein, the producing zone having a temperature above about 200° F. A method of the invention is comprised of the following steps. Spaced openings are formed through the casing and cement into the unconsolidated producing zone. A first hardenable resin composition is then injected into the unconsolidated producing zone adjacent to the well bore. Without waiting for the first hardenable resin composition to harden, a hydraulic fracturing treatment fluid containing proppant particles coated with a second hardenable resin composition is injected through the openings into the unconsolidated producing zone at a rate and pressure sufficient to fracture the producing zone. The proppant particles coated with the second hardenable resin composition are caused to be deposited in the fracture. The first hardenable resin composition and the second hardenable resin composition are then allowed to harden by heat whereby the unconsolidated producing zone adjacent to the well bore and the proppant particles in the fractures are consolidated into hard permeable masses so that proppant particles and formation solids are prevented from flowing out of the producing zone with produced hydrocarbons.

The objects, features and advantages of the present invention will be readily apparent to those skilled in the art upon a reading of the description of preferred embodiments which follows.

DESCRIPTION OF PREFERRED EMBODIMENTS

The present invention provides improved methods of completing an unconsolidated hydrocarbon producing zone having a temperature above about 200° F. penetrated by a well bore having casing cemented therein. The methods are basically comprised of the following steps. Spaced openings are formed through the casing and cement into the unconsolidated producing zone. A first hardenable resin composition is injected through the openings into the unconsolidated producing zone adjacent to the well bore and at least a portion of the resin composition is optionally displaced from the pore spaces of the producing zone by an aqueous salt solution. Without waiting for the first hardenable resin composition injected into the producing zone to harden, a fracturing fluid containing proppant particles coated with a second hardenable resin composition is injected through the openings into the unconsolidated producing zone at a rate and pressure sufficient to fracture the producing zone. The proppant particles coated with the second hardenable resin composition are then caused to be deposited in the fractures. Thereafter, the first hardenable resin composition and the second hardenable resin composition are allowed to harden by heat whereby the unconsolidated producing zone adjacent to the well bore and the proppant particles in the fractures are consolidated into hard permeable masses so that the proppant particles and formation solids are prevented from flowing out of the producing zone with produced hydrocarbons.

The spaced openings in the casing and cement are preferably formed on opposite sides of the casing and cement in directions parallel with the maximum horizontal stress in the subterranean zone. This causes opposing vertical fractures to be formed in the unconsolidated producing zone, sometimes referred to in the art as "by-wing" fractures. The openings through the casing and cement are spaced longitudinally on the opposite sides of the casing utilizing well known perforating or hydrojetting techniques to produce perforations or slots in the casing and cement.

The first hardenable resin composition which is injected through the openings in the casing and cement into the unconsolidated producing zone adjacent to the well bore is comprised of a furfuryl alcohol resin, furfuryl alcohol, a solvent for the furfuryl alcohol resin and a silane coupling agent to enhance the bonding of the resin to the particulate solids in the producing zone. The first hardenable resin composition can optionally also include a benzalkonium chloride cationic surfactant for enhancing the compatibility between the formation particulate solids and the salt solution used to displace the resin composition from the pore spaces of the producing zone.

Furfuryl alcohol resins are readily available from a number of commercial sources. For example, suitable furfuryl alcohol resin is commercially available from The Durez Corporation under the trade designation "DUREZ 33682™". Upon curing by heat in a subterranean zone, the furfuryl alcohol resin forms an insoluble mass that is highly resistant to chemical attack and thermal degradation, i.e., the cured resin resists thermal degradation at temperatures up to 700° F. The furfuryl alcohol resin is generally present in the first hardenable resin composition in an amount in the range of from about 10% to about 75% by weight of the composition and more preferably in an amount of from about 20% to about 40%.

The furfuryl alcohol is generally present in the first hardenable resin composition in an amount in the range from about 1% to about 20% by weight of the composition and more preferably in an amount of from about 5% to about 15%.

A variety of solvents for the furfuryl alcohol resin can be utilized including, but not limited to, furfuryl alcohol, furfuryl acetate, dipropylene glycol methyl ether, dipropylene glycol dimethyl ether, diethylene glycol methyl ether, ethylene glycol monobutyl ether, diethylene glycol monobutyl ether, dimethyl formamide, propylene carbonate, butyl acetate, d'limonene and fatty acid methyl esters. Of these, ethylene glycol monobutyl ether, furfuryl alcohol and furfuryl acetate are preferred with furfuryl acetate being the most preferred. The solvent is included in the first hardenable resin composition in an amount in the range of from about 20% to about 80% by weight of the composition and more preferably in an amount of from about 30% to about 65%. Examples of silane coupling agents which can be utilized in the first hardenable resin composition include, but are not limited to, N-2-(aminoethyl)-3-aminopropyl-trimethoxysilane, 3-glycidoxypropyltrimethoxysilane and n-beta-(aminoethyl)-gamma-aminopropyltrimethoxysilane. Of these, n-beta-(aminoethyl)-gamma-aminopropyltrimethoxysilane is preferred. The silane coupling agent is included in the first hardenable resin composition in an amount in the range of from about 0.1% to about 3% by weight of the composition and more preferably in an amount of from about 0.5% to about 2%.

A variety of fracturing fluids can be utilized in accordance with the present invention for forming fractures in the unconsolidated hydrocarbon producing zone and carrying resin composition coated proppant particles into the fractures. The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fracturing fluid. The increased viscosity of the gelled or gelled and cross-linked fracturing fluid reduces fluid loss and allows the fracturing fluid to transport significant quantities of suspended proppant particles. The water utilized to form the fracturing fluid can be fresh water, salt water, brine or any other aqueous liquid which does not adversely react with the other components utilized in accordance with this invention.

A variety of gelling agents can be utilized including hydratable polymers which contain one or more functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Examples of natural hydratable polymers containing the foregoing functional groups and units which are particularly useful in accordance with the present invention include guar gum and derivatives thereof such as hydroxypropylguar and cellulose derivatives such as hydroxyethylcellulose. The gelling agent used in the fracturing fluid is generally present in an amount in the range of from about 0.1% to about 2% by weight of water therein and more preferably in an amount of from about 0.2% to about 1%.

Examples of cross-linking agents which can be utilized to further increase the viscosity of a gelled fracturing fluid are alkali metal borates, borax, boric acid and compounds which are capable of releasing multivalent metal ions in aqueous solutions. Examples of the multivalent metal ions are chromium, zirconium, antimony, titanium, iron, zinc or aluminum. When used, the cross-linking agent is included in the fracturing fluid in an amount in the range of from about 0.01% to about 2% by weight of water therein and more preferably in an amount of from about 0.1% to about 1%.

The fracturing fluid generally also includes a delayed viscosity breaker which functions to reduce the viscosity of the fracturing fluid and to cause proppant particles suspended in the fracturing fluid to be deposited in the fractures. Examples of delayed viscosity breakers which can be utilized include, but are not limited to, alkali metal and ammonium persulfates which are delayed by being encapsulated in a material which slowly releases the breaker, alkali metal chlorites, alkali metal hypochlorites and calcium hypochlorites. When used, the delayed viscosity breaker is included in the fracturing fluid in an amount in the range of from about 1% to about 5% by weight of water therein.

The proppant particles utilized in accordance with the present invention are generally of a size such that formation particulate solids that migrate with produced hydrocarbons are prevented from being produced from the subterranean zone. Various kinds of proppant particles can be utilized including graded sand, bauxite, ceramic materials, glass materials, walnut hulls, polymer beads and the like. Generally, the proppant particles have a size in the range of from about 2 to about 400 mesh U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

The second hardenable resin composition which is coated on the proppant particles utilized is basically comprised of a furfuryl alcohol resin, furfuryl alcohol, a solvent for the furfuryl alcohol resin, a silane coupling agent and a surfactant for facilitating the coating of the resin on the proppant particles and for causing the hardenable resin to flow to contact points between adjacent resin coated proppant particles. The second hardenable resin composition can optionally also include a hydrolyzable ester for breaking gelled fracturing fluid films on the proppant particles.

The furfuryl alcohol resin and the furfuryl alcohol are the same as described above. The furfuryl alcohol resin is generally present in the second hardenable resin composition in an amount in the range of from about 40% to about 75% by weight of the composition and more preferably in an amount of from about 50% to about 65%. The furfuryl alcohol is generally present in the second hardenable resin composition in an amount in the range from about 1% to about 20% by weight of the composition and more preferably in an amount of from about 5% to about 15%.

Examples of solvents for the furfuryl alcohol resin which have flash points above about 125° F. and can be utilized include, but are not limited to, dipropylene glycol methyl ether, dipropylene glycol dimethyl ether, diethylene glycol methyl ether, ethylene glycol monobutyl ether, diethylene glycol monobutyl ether, dimethyl formamide, propylene carbonate, butyl acetate, furfuryl acetate, d'limonene and fatty acid methyl esters. Of these, ethylene glycol monobutyl ether is preferred. The solvent is included in the second hardenable resin composition in an amount in the range of from about 10% to about 40%, more preferably in an amount of about 15% to about 30%. The silane coupling agent is also the same as described above and is present in the second hardenable resin composition in an amount in the range of from about 0.1% to about 3% by weight of the composition and more preferably in an amount of from about 0.5% to about 2%.

Surfactants for facilitating the coating of the resin on the proppant particles and for causing the resin to flow to the contact points between adjacent resin coated proppant particles utilized in the second hardenable resin composition include, but are not limited to, ethoxylated nonylphenol phosphate ester surfactants, mixtures of one or more cationic surfactants and one or more non-anionic surfactants and a $C_{12}$–$C_{22}$ alkyl phosphonate surfactant. The mixtures of one or more cationic and non-anionic surfactants are described in U.S. Pat. No. 6,311,733 issued to Todd et al. on Nov. 6, 2001 which is incorporated herein by reference. Of the surfactants that can be used, a $C_{12}$–$C_{22}$ alkyl phosphonate surfactant is preferred. The surfactant or surfactants utilized are included in the second hardenable resin composition in an amount in the range of from about 1% to about 15% by weight of the composition and more preferably in an amount of from about 5% to about 10%.

Hydrolyzable esters for breaking gelled fracturing fluid films on the proppant particles can optionally be included in the second hardenable resin composition. Examples of hydrolyzable esters which can be used include, but are not limited to, a mixture of dimethylglutarate, dimethyladipate and dimethylsuccinate, sorbitol, catechol, dimethylthiolate, methyl salicylate, dimethyl salicylate, dimethyl succinate and terbutylhydroperoxide. Of these, a mixture of dimethylglutarate, dimethyladipate and dimethylsuccinate are preferred. When used, the hydrolyzable ester is included in the second hardenable resin composition in an amount in the range of from about 0% to about 3% by weight of the composition and more preferably in an amount of from about 1.5%.

The viscosity of the first hardenable resin composition injected into the unconsolidated producing zone adjacent to the well bore is preferably less than about 50 centipoises. The viscosity of the second hardenable resin composition coated on the proppant particles is preferably in the range of from about 1200 centipoises to about 2500 centipoises.

As mentioned above, the unconsolidated hydrocarbon producing zone adjacent to the well bore can be flushed with a salt solution, such as a 15% by weight aqueous NaCl solution before and after the injection of the first hardenable resin composition into the zone to remove drilling fluid and other contaminants therefrom as well as to displace resin composition from the pore spaces of the producing zone.

As is well understood by those skilled in the art, after the by-wing fractures have been formed in the unconsolidated hydrocarbon producing zone and proppant particles coated with the second hardenable resin composition suspended in the fracturing fluid have been placed in the fractures, the coated proppant is caused to be deposited in the fractures. This is accomplished by the reduction in viscosity of the fracturing fluid as a result of the presence of a delayed breaker of the type described above in the fracturing fluid. The delayed breaker reduces the viscosity of the fracturing fluid which causes the resin composition coated proppant to be deposited in the fractures after which the fracturing fluid is returned to the surface. Thereafter, the first hardenable resin composition and the second hardenable resin composition are allowed to harden by heat whereby the unconsolidated producing zone adjacent to the well bore and the proppant particles in the fractures are consolidated into hard permeable masses so that proppant particles and formation solids are prevented from flowing out of the producing zone with produced hydrocarbons.

A method of this invention for completing an unconsolidated hydrocarbon producing zone penetrated by a well bore having casing cemented therein, the producing zone having a temperature above about 200° F. is comprised of the steps of: (a) forming spaced openings through the casing and cement into the unconsolidated producing zone; (b) injecting a first hardenable resin composition through the openings into the unconsolidated producing zone adjacent to the well bore and optionally displacing at least a portion of the resin composition from the pore spaces of the producing zone with an aqueous salt solution; (c) without waiting for the first hardenable resin composition injected in accordance with step (b) to harden, injecting a fracturing fluid containing proppant particles coated with a second hardenable resin composition through the openings into the unconsolidated producing zone at a rate and pressure sufficient to fracture the producing zone; (d) causing the proppant particles coated with the second hardenable resin composition to be deposited in the fractures; and (e) allowing the first hardenable resin composition and the second hardenable resin composition to harden by heat whereby the unconsolidated producing zone adjacent to the well bore and the proppant particles in the fractures are consolidated into hard permeable masses so that proppant particles and formation solids are prevented from flowing out of the producing zone with produced hydrocarbons.

Another method of this invention for completing an unconsolidated hydrocarbon producing zone penetrated by a well bore having casing cemented therein, the producing zone having a temperature above about 200° F. is comprised of the steps of: (a) forming spaced openings through the casing and cement into the unconsolidated producing zone; (b) injecting a first hardenable resin composition through the openings into the unconsolidated producing zone adjacent to the well bore and optionally displacing the resin composition from the pore spaces of the producing zone with an aqueous salt solution, the first hardenable resin composition being comprised of a furfuryl alcohol resin, furfuryl alcohol, a furfuryl acetate solvent and an n-beta-(aminoethyl)-gamma-aminopropyltrimethoxysilane coupling agent; (c)

without waiting for the first hardenable resin composition injected in accordance with step (b) to harden, injecting a fracturing fluid containing proppant particles coated with a second hardenable resin composition through the openings into the unconsolidated producing zone at a rate and pressure sufficient to fracture the producing zone, the second hardenable resin composition being comprised of furfuryl alcohol resin, furfuryl alcohol, ethylene glycol monobutyl ether solvent, an n-beta-(aminoethyl)-gamma-aminopropyltrimethoxysilane coupling agent and a $C_{12}$–$C_{22}$ alkyl phosphonate surfactant; (d) causing the proppant particles coated with the second hardenable resin composition to be deposited in the fractures; and (e) allowing the first hardenable resin composition and the second hardenable resin composition to harden by heat whereby the unconsolidated producing zone adjacent to the well bore and the proppant particles in the fractures are consolidated into hard permeable masses so that proppant particles and formation solids are prevented from flowing out of the producing zone with produced hydrocarbons.

In order to further illustrate the methods of this invention, the following examples are given.

EXAMPLE 1

A test was conducted to determine if the first hardenable resin composition coated on sand would remain after the sand was subjected to water flow. 250 grams of 20/40-mesh sand were coated with the first hardenable resin composition of this invention. The first hardenable resin composition was comprised of 6 milliliters of furfuryl alcohol resin, 3 milliliters of furfuryl acetate and 0.05 milliliters of silane (n-beta-(aminoethyl)-gamma-aminopropyltrimethoxysilane). The resulting first hardenable resin composition coated sand was packed into a flow chamber and wire screens of 80-mesh were installed at both ends of the sand pack to keep the sand in place during flow. Hot tap water having a temperature of 130° F. was flowed through the sand pack in the float chamber at a flow rate of 2 liters per minute. After each of the time periods given in Table I below during which the hot water was flowed through the resin coated sand pack, a sample of the sand from the flow chamber was collected for Loss-On-Ignition analysis to determined how much resin remained on the sand. The results of the test are given in Table I.

TABLE I

Effect Of Fluid Flow On Resin Coated Proppant

| Time, minutes | Resin Remaining On Proppant, % by weight |
|---|---|
| No Flow | 1.86 |
| 30 | 1.53 |
| 60 | 1.47 |
| 90 | 1.44 |
| 120 | 1.46 |
| 180 | 1.46 |

The results of the test indicate that the furfuryl alcohol resin adheres to and remains on proppant particles prior to hardening without washing off the particles as a result of water flow.

EXAMPLE 2

The consolidation of particulate solids in the unconsolidated producing zone was simulated in the laboratory to determine its compressive strength after being treated in accordance with the present invention. 200 grams of 70/170-mesh sand were packed into a cylindrical brass chamber. Under vacuum suction, the sand pack was first flushed with 200 milliliters of 15% sodium chloride solution which contained 0.5 milliliters of a benzalkonium chloride cationic surfactant. The sand pack was then flushed with a volume of 30.3 milliliters of the first hardenable resin composition comprised of 20 milliliters of furfuryl alcohol resin, 10 milliliters of furfuryl acetate solvent and 0.3 milliliters of (n-beta-(aminoethyl)-gamma-aminopropyltrimethoxysilane). The sand pack was then subjected to an overflush with 200 milliliters of 15% sodium chloride. Without applying any closure stress, the sand pack was allowed to cure in an oven at 325° F. for 48 hours. Cores of the resulting consolidated sand pack were obtained after curing and their unconfined compressive strengths were measured. The average compressive strength was 3,540 pounds per square inch.

EXAMPLE 3

The deposit of proppant particles coated with the second hardenable resin composition of this invention and the consolidation of the proppant without closure stress being applied was simulated. 250 grams of bauxite proppant particles were coated with 3% by weight of the proppant of the resin comprised of 7.05 milliliters of furfuryl alcohol resin, 0.075 milliliters of (n-beta-(aminoethyl)-gamma-aminopropyltrimethoxysilane) and 0.375 milliliters of a $C_{12}$–$C_{22}$ alkyl phosphonate surfactant. The resin coated proppant particles were then added to 300 milliliters of carboxymethylhydroxypropylguar fracturing fluid while the fracturing fluid was being stirred with an overhead stirrer. To the resulting slurry, appropriate amounts of cross-linker and breaker were added. The slurry was continued to be stirred for 1 hour at 180° F. to stimulate the effect of being pumped through a well bore and suspended in the fracture. The resin coated proppant particles were removed from the fracturing fluid and portions of the resin coated proppant particles were packed in chambers and cured in an oven at the temperatures and for the times set forth in Table II below.

TABLE II

Effect Of Cure Temperature And Time On Proppant Pack Strength

| Cure Temperature, ° F. | Compressive Strength, psi | | | | |
|---|---|---|---|---|---|
| | 3 hrs. | 6 hrs. | 24 hrs. | 48 hrs. | 7 days |
| 250 | — | — | — | — | 169 |
| 275 | — | — | 145 | 230 | — |
| 300 | — | 20 | 274 | 422 | 1003 |
| 325 | 71 | 212 | 666 | 1255 | 1535 |
| 350 | 80 | 361 | 1261 | 1561 | 1642 |

The results set forth in Table II above show that the second hardenable resin composition coated proppant consolidates the proppant particles and the consolidation strength improves with time and temperature.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:
1. A method of completing an unconsolidated hydrocarbon producing zone penetrated by a well bore having casing cemented therein, said producing zone having a temperature above about 200° F. comprising the steps of:

(a) forming spaced openings through said casing and cement into said unconsolidated producing zone;

(b) injecting a first hardenable resin composition through said openings into said unconsolidated producing zone adjacent to said well bore;

(c) without waiting for said first hardenable resin composition injected in accordance with step (b) to harden, injecting a fracturing fluid containing proppant particles coated with a second hardenable resin composition through said openings into said unconsolidated producing zone at a rate and pressure sufficient to fracture said producing zone;

(d) causing said proppant particles coated with said second hardenable resin composition to be deposited in said fractures; and (e) allowing said first hardenable resin composition and said second hardenable resin composition to harden by heat whereby said unconsolidated producing zone adjacent to the well bore and said proppant particles in the fractures are consolidated into hard permeable masses so that proppant particles and formation solids are prevented from flowing out of said producing zone with produced hydrocarbons.

2. The method of claim 1 wherein said first hardenable resin composition is at least partially displaced from the pore spaces of the producing zone with an aqueous salt solution prior to fracturing said producing zone.

3. The method of claim 1 wherein said spaced openings are perforations or slots.

4. The method of claim 1 wherein said first hardenable resin composition injected in accordance with step (b) is comprised of a furfuryl alcohol resin, furfuryl alcohol, a solvent for said resin and a silane coupling agent.

5. The method of claim 4 wherein said furfuryl alcohol resin is present in said first hardenable resin composition in an amount in the range of from about 10% to about 75% by weight of said composition.

6. The method of claim 4 wherein said furfuryl alcohol is present in the first hardenable resin composition in an amount in the range from about 1% to about 20% by weight of said composition.

7. The method of claim 4 wherein said solvent for said resin is selected from the group consisting of ethylene glycol monobutyl ether, furfuryl alcohol and furfuryl acetate.

8. The method of claim 4 wherein said solvent is furfuryl acetate.

9. The method of claim 4 wherein said solvent is present in said first hardenable resin composition in an amount in the range of from about 20% to about 80% by weight of said composition.

10. The method of claim 4 wherein said silane coupling agent is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

11. The method of claim 4 wherein said silane coupling agent is comprised of n-beta-(aminoethyl)-gamma-aminopropyltrimethoxysilane.

12. The method of claim 4 wherein said silane coupling agent is present in said first hardenable resin composition in an amount in the range of from about 0.1% to about 3% by weight of said composition.

13. The method of claim 1 wherein said proppant particles are selected from the group consisting of graded sand, bauxite, ceramic materials, glass materials, walnut hulls and polymer beads.

14. The method of claim 1 wherein said proppant particles are graded sand.

15. The method of claim 1 wherein said second hardenable resin composition coated on said proppant particles is comprised of a furfuryl alcohol resin, a furfuryl alcohol, a solvent for said resin, a silane coupling agent and a surfactant for facilitating the coating of said resin on said proppant particles and for causing said hardenable resin to flow to contact points between adjacent resin coated proppant particles.

16. The method of claim 15 wherein said furfuryl alcohol resin is present in said second hardenable resin composition in an amount in the range of from about 40% to about 75% by weight of said composition.

17. The method of claim 15 wherein said furfuryl alcohol is present in said second hardenable resin composition in an amount in the range from about 1% to about 20% by weight of said composition.

18. The method of claim 15 wherein said solvent for said resin in said second hardenable resin composition is selected from the group consisting of dipropylene glycol methyl ether, dipropylene glycol dimethyl ether, diethylene glycol methyl ether, ethylene glycol monobutyl ether, diethylene glycol butyl ether, dimethyl formamide, propylene carbonate, butyl acetate, furfuryl acetate, d'limonene and fatty acid methyl esters.

19. The method of claim 15 wherein said solvent for said resin in said second hardenable resin composition is ethylene glycol monobutyl ether.

20. The method of claim 15 wherein said solvent for said resin is present in said second hardenable resin composition in an amount in the range of from about 10% to about 40% by weight of said composition.

21. The method of claim 15 wherein said silane coupling agent is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

22. The method of claim 15 wherein said silane coupling agent is comprised of n-beta-(aminoethyl)-gamma-aminopropyltrimethoxysilane.

23. The method of claim 15 wherein said silane coupling agent is present in said second hardenable resin composition in an amount in the range of from about 0.1% to about 3% by weight of said composition.

24. The method of claim 15 wherein said surfactant comprises at least one member selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

25. The method of claim 15 wherein said surfactant is comprised of a $C_{12}$–$C_{22}$ alkyl phosphonate surfactant.

26. The method of claim 15 wherein said surfactant is present in said second hardenable resin composition in an amount in the range of from about 1% to about 15% by weight of said composition.

27. The method of claim 15 wherein said second hardenable resin composition further comprises a hydrolyzable ester for breaking gelled fracturing fluid films on said proppant particles.

28. The method of claim 27 wherein said hydrolyzable ester comprises at least one member selected from the group consisting of a mixture of dimethylglutarate, dimethyladipate and dimethylsuccinate, sorbitol, catechol, dimethylthiolate, methyl salicylate, dimethyl salicylate, dimethyl succinate and terbutylhydroperoxide.

29. The method of claim 27 wherein said hydrolyzable ester is comprised of a mixture of dimethylglutarate, dimethyladipate and dimethylsuccinate.

30. The method of claim 27 wherein said hydrolyzable ester is present in said second hardenable resin in an amount in the range of from about 0% to about 3% by weight of said composition.

31. The method of claim 1 wherein said first hardenable resin composition has a viscosity below about 50 centipoises.

32. The method of claim 1 wherein said second hardenable resin composition has a viscosity in the range of from about 500 to about 5,000 centipoises.

33. A method of completing an unconsolidated hydrocarbon producing zone penetrated by a well bore having casing cemented therein, said producing zone having a temperature above about 200° F. comprising the steps of:
  (a) forming spaced openings through said casing and cement into said unconsolidated producing zone;
  (b) injecting a first hardenable resin composition through said openings into said unconsolidated producing zone adjacent to said well bore, said first hardenable resin composition being comprised of a furfuryl alcohol resin, furfuryl alcohol, a furfuryl acetate solvent and an n-beta-(aminoethyl)-gamma-aminopropyltrimethoxysilane coupling agent;
  (c) without waiting for said first hardenable resin composition injected in accordance with step (b) to harden, injecting a fracturing fluid containing proppant particles coated with a second hardenable resin composition through said openings into said unconsolidated producing zone at a rate and pressure sufficient to fracture said producing zone, said second hardenable resin composition being comprised of a furfuryl alcohol resin, furfuryl alcohol, an ethylene glycol monobutyl ether solvent, an n-beta-(aminoethyl)-gamma-aminopropyltrimethoxysilane coupling agent and a $C_{12}$–$C_{22}$ alkyl phosphonate surfactant;
  (d) causing said proppant particles coated with said second hardenable resin composition to be deposited in said fractures; and
  (e) allowing said first hardenable resin composition and said second hardenable resin composition to harden by heat whereby said unconsolidated producing zone adjacent to the well bore and said proppant particles in the fractures are consolidated into hard permeable masses so that proppant particles and formation solids are prevented from flowing out of said producing zone with produced hydrocarbons.

34. The method of claim 33 wherein said first hardenable resin composition is at least partially displaced from the pore spaces of the producing zone with an aqueous salt solution prior to fracturing said producing zone.

35. The method of claim 33 wherein said spaced openings are perforations or slots.

36. The method of claim 33 wherein said furfuryl alcohol resin is present in said first hardenable resin composition in an amount in the range of from about 10% to about 75% by weight of said composition.

37. The method of claim 33 wherein said furfuryl alcohol is present in said first hardenable resin composition in an amount in the range of from about 1% to about 20% by weight of said composition.

38. The method of claim 33 wherein said furfuryl acetate solvent is present in said first hardenable resin composition in an amount in the range of from about 20% to about 80% by weight of said composition.

39. The method of claim 33 wherein said silane coupling agent is present in said first hardenable resin composition in an amount in the range of from about 0.1% to about 3% by weight of said composition.

40. The method of claim 33 wherein said furfuryl alcohol resin is present in said second hardenable resin composition in an amount in the range of from about 40% to about 75% by weight of said composition.

41. The method of claim 33 wherein said furfuryl alcohol is present in said second hardenable resin composition in an amount in the range of from about 1% to about 20% by weight of said composition.

42. The method of claim 33 wherein said ethylene glycol monobutyl ether solvent is present in said second hardenable resin composition in an amount in the range of from about 10% to about 40% by weight of said composition.

43. The method of claim 33 wherein said silane coupling agent is present in said second hardenable resin composition in an amount in the range of from about 0.1% to about 3% by weight of said composition.

44. The method of claim 33 wherein said surfactant is present in said second hardenable resin composition in an amount in the range of from about 1% to about 15% by weight of said composition.

45. The method of claim 33 wherein said second hardenable resin composition further comprises a hydrolyzable ester for breaking gelled fracturing fluid films on said proppant particles.

46. The method of claim 45 wherein said hydrolyzable ester comprises at least one member selected from the group consisting of a mixture of dimethylglutarate, dimethyladipate and dimethylsuccinate, sorbitol, catechol, dimethylthiolate, methyl salicylate, dimethyl salicylate, dimethyl succinate and terbutylhydroperoxide.

47. The method of claim 45 wherein said hydrolyzable ester is comprised of a mixture of dimethylglutarate, dimethyladipate and dimethylsuccinate.

48. The method of claim 45 wherein said hydrolyzable ester is present in said second hardenable resin in an amount in the range of from about 0% to about 3% by weight of said composition.

49. The method of claim 33 wherein said first hardenable resin composition has a viscosity below about 50 centipoises.

50. The method of claim 33 wherein said second hardenable resin composition has a viscosity in the range of from about 1,200 to about 2,500 centipoises.

* * * * *